United States Patent
Haner et al.

(10) Patent No.: US 7,166,662 B2
(45) Date of Patent: Jan. 23, 2007

(54) HOT MELT ADHESIVE COMPOSITION

(75) Inventors: Dale L. Haner, Ringwood, NJ (US); David J. Good, Somerville, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 327 days.

(21) Appl. No.: 10/680,276

(22) Filed: Oct. 7, 2003

(65) Prior Publication Data

US 2005/0075431 A1    Apr. 7, 2005

(51) Int. Cl.
C08L 93/04 (2006.01)
C08L 91/06 (2006.01)
C09J 123/08 (2006.01)
C09J 131/04 (2006.01)
C09J 133/08 (2006.01)

(52) U.S. Cl. ............... 524/271; 524/272; 524/487; 524/489

(58) Field of Classification Search ........ 524/271–272, 524/487, 489
See application file for complete search history.

(56) References Cited

U.S. PATENT DOCUMENTS

| | | | |
|---|---|---|---|
| 4,956,207 A | | 9/1990 | Kauffman |
| 5,340,863 A | * | 8/1994 | Krutzel ................ 524/272 |
| 5,500,472 A | * | 3/1996 | Liedermooy et al. ....... 524/272 |
| 5,670,566 A | | 9/1997 | Liedermooy et al. |
| 5,763,516 A | * | 6/1998 | Godfrey ................ 524/271 |
| 6,117,945 A | * | 9/2000 | Mehaffy et al. ........... 525/159 |
| 6,593,407 B2 | * | 7/2003 | Haner et al. ............. 524/272 |
| 2002/0146526 A1 | | 10/2002 | Brian et al. |
| 2004/0162396 A1 | | 8/2004 | Chu et al. |

FOREIGN PATENT DOCUMENTS

| | | | |
|---|---|---|---|
| EP | 0 721 006 | * | 10/1996 |
| EP | 0 803 559 | | 10/1997 |
| EP | 0 934 990 | | 8/1999 |
| EP | 1 099 742 | | 5/2001 |
| JP | 11 323279 | | 11/1999 |

* cited by examiner

*Primary Examiner*—Peter Szekely
(74) *Attorney, Agent, or Firm*—Cynthia L. Foulke

(57) ABSTRACT

A low application temperature, high heat resistant hot melt adhesive comprising an ethylene n-butyl acrylate copolymer having a melt index (MI) of 750 grams/10 minutes or higher and an ethylene vinyl acetate (EVA) polymer having a MI of 750 grams/10 minutes or higher are particularly well suited for case and carton sealing operations.

15 Claims, No Drawings

HOT MELT ADHESIVE COMPOSITION

FIELD OF THE INVENTION

The invention relates to a low application temperature hot melt adhesive composition with good high temperature adhesion.

BACKGROUND OF THE INVENTION

Hot melt adhesives are widely used for various commercial applications such as product assembly and packaging, including case sealing and carton closing operations. Such hot melt adhesives are applied to a substrate while in its molten state and cooled to harden the adhesive layer.

Most commercially available hot melt adhesives require temperatures of 350° F. (177° C.) or greater to ensure complete melting of all the components and also to achieve a satisfactory application viscosity. The need for such elevated temperatures is not without problems. The high temperatures increase operator risks with respect both to burns and to inhalation of residual volatiles. In addition, use of high temperatures require more energy, placing greater demands on the manufacturing facility. While adhesive formulations that can be applied at temperatures below 300° F. (151° C.) can be prepared using low molecular weight components or a high wax content, application viscosity may suffer and there is a loss of adhesive properties, e.g., toughness, heat resistance and, often, specific adhesion to a substrate. While softer or more amorphous components may be added in order to improve adhesion, these components reduce the effective heat resistance.

There continues to be a need in the art for improved hot melt adhesives that can be applied at temperatures of from about 100° C. to about 135° C., have good bond strength with exceptional toughness, good heat resistance and acceptable application viscosity, even when prepared with relatively low molecular weight components. The current invention fulfills this need.

SUMMARY OF THE INVENTION

The invention provides an adhesive comprising relatively low molecular weight ethylene polymers ($\geq$750 MI) that can be applied at low temperatures (i.e., from about 100° C. to about 150° C.). The adhesive can be applied at a low temperature but still imparts heat stress normally associated with higher molecular weight polymers and has a longer pot life (less thermal degradation), exhibits less stringing, and is less damaging to heat sensitive substrates.

One aspect of the invention is directed to a hot melt adhesive comprising a mixture of low molecular weight ethylene copolymers, i.e., an ethylene copolymer having a melt index (MI) of 750 grams/10 minutes or higher, more typically at least about 900 grams/10 minutes. Preferred are ethylene n-butyl acrylate (EnBA) copolymers having melt indices (MI) of 750 grams/10 minutes or higher. Particularly preferred hot melt adhesives of the invention will comprise an EnBA copolymer having a melt index (MI) of 750 grams/10 minutes or higher and an ethylene vinyl acetate (EVA) copolymer having a MI of 750 grams/10 minutes or higher. Preferred embodiments will also comprise a wax, in particular a Fischer-Tropsch wax, and a rosin derived tackifier.

Adhesives of the invention will typically comprise from about 15 to about 40 wt % of low molecular weight ethylene copolymers. Preferred adhesives will generally comprise from about 20 to about 30 wt % EnBA copolymer containing from about 30 to about 40 wt % of n-butyl acrylate, from about 5 to about 15 wt % EVA copolymer containing from about 20 to about 35 wt % of vinyl acetate, from about 20 to about 40 wt % of a Fischer-Tropsch wax having a melting point of from about 60 to about 80° C., and from about 20 to about 45 wt % of a modified rosin ester with a minimum softening point of about 110° C. Preferred modified rosin tackifiers are maleic anhydride modified rosins, Chinese gum rosins being particularly preferred.

Particularly preferred adhesive formulations will comprise about 25 wt % of an EnBA copolymer containing 33 wt % n-butyl acrylate and having a MI of about 750 or greater, about 10 wt % of an EVA copolymer containing about 28 wt % vinyl acetate and having MI of about 750 or greater, 30% of a Fischer-Tropsch wax having a melting point of about 71° C., and 35% of a modified rosin ester with a minimum softening point of 110° C.

Another aspect of the invention is directed to a method of sealing and/or making or forming a case, a carton, a tray, a box or a bag. These methods comprise using a hot melt adhesive comprising an adhesive polymer, a wax and a tackifier, more specifically an adhesive polymer comprising a mixture of low molecular weight ethylene copolymers, preferably a mixture of EnBA and EVA copolymers having a MI of at least about 750 grams/10 minutes, a Fischer-Tropsch wax, and a modified rosin tackifier.

Still another aspect of the invention is directed to an article of manufacture comprising an adhesive polymer, wax and modified rosin tackifier. Preferred articles include cartons, cases, trays, bags and like packaging articles used for packaging products that are formed using a hot melt adhesive comprising a mixture of low molecular weight ethylene copolymers, preferably a mixture of EnBA and EVA copolymers having a Ml of at least about 750 grams/10 minutes, a Fischer-Tropsch wax, and a modified rosin tackifier. The packaging article may comprise cardboard or paperboard that has been adhered by such hot melt adhesives. In another embodiment, the adhesive is pre-applied to the article, e.g., carton, case, tray or bag during the manufacture thereof, and prior to packaging of a product. Other articles include but are not limited to books and nonwovens such as diapers and the like.

Yet another aspect of the invention is directed to packaged articles contained within a carton, case, tray or bag, such as a packaged food, wherein the carton, case, tray or bag comprises an adhesive comprising a mixture of low molecular weight ethylene copolymers, preferably a mixture of EnBA and EVA copolymers having a MI of at least about 750 grams/10 minutes, a Fischer-Tropsch wax, and a modified rosin tackifier.

Another aspect of the invention is directed to a process for bonding a substrate to a similar or dissimilar substrate comprising applying to at least one substrate a molten hot melt adhesive composition and bonding said substrates together, said hot melt adhesive comprising a mixture of low molecular weight ethylene copolymers, preferably a mixture of EnBA and EVA copolymers having a MI of at least about 750 grams/10 minutes, a Fischer-Tropsch wax, and a modified rosin tackifier.

DETAILED DESCRIPTION OF THE INVENTION

All documents cited herein are incorporated in their entireties by reference.

The invention is directed to a low application temperature, high heat resistant hot melt adhesive comprising an adhesive polymer, a wax and a rosin tackifier. In addition to having high heat resistance, the adhesives of the invention also have good cold tolerance. The adhesive of the invention is particularly well-suited for use in automated assembly applications, such as but not limited to carton, case or tray formation where the adhesive is applied from large bulk industrial melting systems where assemblies speeds can reach hundreds of units per minutes.

It has now been discovered that compositions comprising a mixture of low molecular weight ethylene copolymers, more preferable a mixture comprising at least one EnBA copolymer having a MI of at least about 750 grams/10 minutes and at least one EVA copolymer having a MI of at least about 750 grams/10 minutes, a Fischer-Tropsch wax, and a modified rosin tackifier may be used as low application temperature hot melt adhesives that exhibit high heat resistance.

Low application temperature means that the adhesive may be applied at a temperature of less than 150° C., preferable below about 140° C., more preferably below about 135° C., even more preferably at about 120° C. down to about 100° C. The low application temperature adhesives of the invention pass the Institute of Packaging Professionals (IoPP) Heat Stress test at temperatures of at least 140° F. (60° C.). The IoPP test, which measures an adhesive's resistance to bond failure at elevated temperatures, is described in the IoPP Technical Journal, Winter 1992, pages 7–9.

Base adhesive polymers used in the practice of the invention comprise a blend of two or more polymers. The term ethylene copolymer, as used herein, refers to homopolymers, copolymers and terpolymers of ethylene.

Examples of ethylene copolymers include copolymers with one or more polar monomers which can copolymerize with ethylene, such as vinyl acetate or other vinyl esters of monocarboxylic acids, or acrylic or methacrylic acid or their esters with methanol, ethanol or other alcohols. Included are ethylene vinyl acetate, ethylene methyl acrylate, ethylene n-butyl acrylate, ethylene 2-ethyl hexyl acrylate, ethylene acrylic acid, ethylene methacrylate and mixtures and blends thereof. Other examples include but are not limited to recycled polyethylene terphthalate and polyethylene, ethylene/α-olefin interpolymers, poly-(butene-1-co-ethylene), atactic polypropylene, low density polyethylene, homogenous linear ethylene/α-olefin copolymers, lower melt index n-butyl acrylate copolymers, ethylene vinyl ester copolymers). Random and block copolymers, as well as blends thereof may be used in the practice of the invention.

The polymer component will usually be present in an amount of from about 15% to about 40%, more preferably from about 20% to about 40%, even more preferably from about 25% to about 35%.

The adhesives of the invention will comprises from about 20 to about 30 wt % of at least one ethylene n-butyl acrylate copolymer having a MI of at least about 750 grams/10 minutes, preferably a MI of 900 grams/10 minutes, and having a n-butyl acrylate content of from about 30 to about 40 wt %. Ethylene n-butyl acrylate copolymers are available from Exxon Chemical under the tradename ENABLE® (e.g., ENABLE® 33900 contains 33% by wt of n-butyl acrylate and has a MI of about 900).

Preferred adhesives for use in the practice of the invention will also comprise from about 5 to about 15 wt % of at least one ethylene vinyl acetate polymer having a MI of at least about 750 grams/10 minutes, preferably a MI of 900 grams/ 10 minutes, and having a vinyl acetate content of from about 20 to about 35% by weight. Ethylene vinyl acetate copolymers are available from DuPont Chemical Co., Wilmington, Del. under the tradename Elvax® (e.g., Elvax® 205W which has a melt index of 800 and a vinyl acetate content of about 28% by weight in the copolymer. Other ethylene vinyl acetate copolymers are available from Exxon Chemical Co. under the tradename Escorene® (e.g., UL 7505) and also from Millennium Petrochemicals, Rolling Meadows, Ill., under the tradename Ultrathene® (e.g., UE 64904) and AT® copolymers available from AT Polymers & Film Co., Charlotte, N.C. (e.g., AT® 1850M) and Evatane® from Atofina Chemicals, Philadelphia, Pa.

The adhesives of the invention will comprise from about 20 to about 40 wt % of a Fischer-Tropsch wax. Fischer-Tropsch waxes (including, e.g., oxidized Fischer-Tropsch waxes, and the like) preferred for use in the practice of the invention will have a melting point of from about 60° C. to about 80° C. Fischer-Tropsch waxes having a melting point about 71° C. are particularly preferred. Fischer-Tropsch waxes that can be used in the practice of the invention are commercially available from Equillon under the tradename Calista SM158.

The adhesives of the invention will also comprise a tackifier. Preferred tackifiers are gum rosins, more preferably modified gum rosins, even more preferably maleic anhydride modified gum rosins. Maleic anhydride modified Chinese gum rosin is particularly useful in the practice of the invention. Commercially available rosins that can be used to practice the invention include Pensel GB-120F (Arakawa Chemical Co.) and Lurefor-120 (LA UNIÓN RESINERA ESPAÑOLA, S.A.).

The rosin tackifier component will typically be used in amounts of from about 10 to about 50 weight percent, more preferably from about 20 to about 45 weight %, by weight of the adhesive composition.

The adhesives of the present invention may also contain a conventional stabilizer or antioxidant. These compounds are added to protect the adhesive from degradation caused by reaction with oxygen induced by such things as heat, light, or residual catalyst from the raw materials such as the tackifying resin.

Among the applicable stabilizers or antioxidants included herein are high molecular weight hindered phenols and multifunctional phenols such as sulfur and phosphorous-containing phenol. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity; this hindrance thus providing the phenolic compound with its stabilizing properties. Representative hindered phenols include; 1,3,5-trimethyl-2, 4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis(2,6-tert-butyl-phenol); 4,4'-thiobis(6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate].

Such antioxidants are commercially available from Ciba-Geigy, Hawthorne, N.Y. and include Irganox® 565, 1010 and 1076 which are hindered phenols. These are primary antioxidants which act as radical scavengers and may be used alone or in combination with other antioxidants such as phosphite antioxidants like Irgafos® 168 available from Ciba-Geigy.

Depending on the contemplated end uses of the adhesives, other additives such as plasticizers, pigments and dyestuffs conventionally added to hot melt adhesives may be included. In addition, small amounts of additional tackifiers and/or waxes such as microcrystalline waxes, hydrogenated castor oil and vinyl acetate modified synthetic waxes may also be incorporated in minor amounts, i.e., up to about 10 weight percent by weight, into the formulations of the present invention.

The adhesive compositions of the present invention are prepared by blending the components in the melt at a temperature of above about 120° C., typically at about 150° C. until a homogeneous blend is obtained, usually about two hours is sufficient. Various methods of blending are known in the art and any method that produces a homogeneous blend is satisfactory.

The resulting adhesives are characterized by a viscosity at 121° C. (250° F.) of less than about 1300 cps. They may be applied low temperatures to provide superior adhesive bonds even when exposed to a wide variety of temperature conditions. The adhesives possess excellent heat resistance and cold resistance.

The hot melt adhesives of the invention find use in, for example, packaging, converting, bookbinding, bag ending and in the nonwovens markets. The adhesives find particular use as case, carton, and tray forming, and as sealing adhesives, including heat sealing applications, for example in the packaging of cereals, cracker and beer products. Encompassed by the invention are containers, e.g., cartons, cases, boxes, bags, trays and the like. If desired, the adhesive may be applied by the manufacturer of the container (i.e., the packaging converter) prior to shipment to the packager. Following packaging, the container is sealed by, e.g., heat sealing or other form of reactivation.

The substrates to be bonded include virgin and recycled kraft, high and low density kraft, chipboard and various types of treated and coated kraft and chipboard. Composite materials are also used for packaging applications such as for the packaging of alcoholic beverages. These composite materials may include chipboard laminated to an aluminum foil that is further laminated to film materials such as polyethylene, Mylar, polypropylene, polyvinylidene chloride, ethylene vinyl acetate and various other types of films. Additionally, these film materials also may be bonded directly to chipboard or Kraft. The aforementioned substrates by no means represent an exhaustive list, as a tremendous variety of substrates, especially composite materials, find utility in the packaging industry.

Hot melt adhesives for packaging are generally extruded in bead form onto a substrate using piston pump or gear pump extrusion equipment. Hot melt application equipment is available from several suppliers including Nordson, ITW and Slautterback. Wheel applicators are also commonly used for applying hot melt adhesives, but are used less frequently than extrusion equipment.

In the following examples, which are provided for illustrative purposes only, all parts are by weight and all temperatures in degrees Celsius unless otherwise noted.

EXAMPLES

Melt viscosities of the hot melt adhesives were determined on a Brookfield Model RVT Thermosel viscometer using a number 27 spindle.

Heat stress was measured by forming a composite construction of adhesive (2×½" compressed) between two pieces of corrugated paperboard of specific dimensions. The adhesive bead forming this composite is then placed under approximately 2 pounds of cantilever stress for 24 hours at elevated temperatures. The maximum temperature at which this construction remains in tact for at least 24 hours is then noted.

Adhesion was determined by applying a 2 mm wide bead of adhesive at 121° C. to a 2 inch by 3 inch piece of paperboard and immediately bringing a second piece of board with fibers direction in the opposite direction into contact. A 200 gram weight was immediately placed on the construction. The bonded specimens were kept at 140° F., room temperature, 40° F., 20° F. and 0° F. for 24 hours. The bonds were separated by hand and a determination made as to the level of fiber tearing.

IoPP Heat Stress was measured as described in the IoPP Technical Journal, Winter 1992, pages 7–9.

Example 1

Adhesive samples having the compositions shown in Table 1 where prepared.

TABLE 1

| Raw Materials | Comparative Sample 1 | Comparative Sample 2 | Comparative Sample 3 | Inventive Sample |
|---|---|---|---|---|
| Calista SM158 163° F. Fischer-Tropsch wax | 30 | 30 | 30 | 30 |
| EVA, 28% VA, 800MI | 10 | 10 | 10 | 10 |
| EnBA, 33% BA, 900MI | 25 | 25 | 25 | 25 |
| Ester Gum 105 (rosin ester) Arakawa | 35 | | | |
| Norsolene M1090 (aromatic C9) | | 35 | | |
| Pensel GB-120F (maleic anhydride modified Chinese gum rosin) | | | | 35 |
| Sylvatac RE 2100 (tall oil resin ester) Arizona | | | 35 | |

The adhesive formulations were prepared using the following equipment: a bench top heating mantle; single blade mixing shaft; electric variable speed motor; quart sized cans; and electronic temperature controller. The adhesives were prepared in 200 gram batches, according to the formulations set forth in Table 1. The quantities recited in Table 1 refer to parts by weight of each component based on ~100 parts used to prepare the formula.

The adhesives were compounded by first adding all the wax and polymer (e.g., EnBA and EVA) to the quart sized can. The can was placed in a glascol heating mantle and allowed to heat up to 150° C. with constant agitation from the mixer. As soon as the solid materials melted and appeared homogeneous at 150° C., the tackifying resin was slowly added. Once the resins were completely dissolved and had been thoroughly mixed, the adhesive was poured out into 8 ounce jars and allowed to cool. The total time for the adhesive preparation was about one hour.

Example 2

Adhesive properties of the formulations shown in Table 1 were analyzed. Included in the analysis was a Comparative Sample A. Comparative Sample A is a low application temperature hot melt comprising EVA and an aromatic modified tackifier commercially available from National Starch and Chemical Company (COOL LOK® 34-250A). The results are shown in Table 2.

TABLE 2

|  | Comparative Sample A | Comparative Sample 1 | Comparative Sample 2 | Comparative Sample 3 | Inventive Sample |
|---|---|---|---|---|---|
| Color | Light Yellow | Light Yellow | Pale Orange | Pale Yellow | Yellow |
| Clarity | Clear | V. hazy | Sl. Hazy | Sl. Hazy | Sl. Hazy |
| Cloud Point, ° F. | 190 | 230 | 225 | NA | NA |
| Viscosity, 250° F. | 1110 | 1400 | 1095 | 1105 | 1275 |
| Adhesion NSC Mead (corrugated paperboard) | | | | | |
| 140° F. | 0, 0 gummy | 100, 75 | 50, 40 | 60, 100 | 100, 100 |
| RT | 100, 100 | 100, 100 | 100, 100 | 100, 100 | 100, 100 |
| 40° | 60, 80 | 100/90, 100/90 | 100, 100 | 100, 100 | 100, 100 |
| 20° F. | 20, 50 | 100, 100 | 100/80, 100 | 100, 95 | 100, 95 |
| 0° F. | NA | 100, 100/90 | 50/20, 70/60 | 100, 100 | 90, 100 |
| IoPP Heat Stress, 140 F. | Fail | Fail | Fail | Fail | Pass |
| Heat Stress, ° F. | | | | | |
| 110 | Pass | Pass | Pass | Fail | Pass |
| 115 | Split | Fail | Pass | Fail | Pass |
| 120 | Fail | Fail | Fail | Fail | Split/Fail |
| Box, 140 F., 8 hours | Fail | Pass | Fail | Fail | Pass |
| Heat Stress, 140° F., 94.5 grams | Fail | Fail | Fail | Fail | Pass |

The adhesive of the invention possesses full fiber tear of corrugated stock at 140° F. while the comparative adhesive samples did not tear corrugated at 130 and 140° F. after 24 hours aging. Adhesive prepared in accordance with the invention passed heat stress at 2 different elevated temperature tests—100 gram cantilever heat stress and the IoPP Heat Stress.

As can be seen in Table 3, commercially available low application temperature hot melt adhesives fail the IoPP test procedure, as do conventional 350° F. applied EVA hot melts. See Table 3 below where INSTANT-LOK® 34-2635 and 34-2710 are conventional 350° F. applied EVA containing hot melt adhesives, COOL LOK® 34-250A (Comparative Sample 1, above) is a low application temperature EVA containing hot melt adhesive, and COOL LOK® 34-2116 is a low application temperature EnBA containing hot melt adhesive, all of which are commercially available from National Starch and Chemical Company.

TABLE 3

IoPP Heat Stress testing
(3 bonds at each temperature)

| Adhesive Application temperature | 34-2635 350° F. | 34-2710 350° F. | 34-250A 250° F. | 34-2116 (Comparative Sample 1) 275° F. | Inventive sample 250° F. |
|---|---|---|---|---|---|
| 150° F. | — | — | — | — | 3-Pass |
| 140° F. | — | — | 3-Fail | — | 3-Pass |
| 135° F. | — | — | 1-Fail | 3-Fail | 3-Pass |
| 130° F. | 3-Fail | 3-Fail | 1-Fail | 1-Fail | 3-Pass |
| 125° F. | 2-Fail | 2-Fail | 1-Fail | 1-Fail | — |
| 120° F. | 0-Fail | 0-Fail | 0-Fail | 0-Fail | — |

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A low application temperature hot melt adhesive that passes the IoPP Heat Stress test at a temperature of at least 140° F., said adhesive comprising a mixture of ethylene copolymers, a wax and a maleic anhydride modified gum rosin ester tackifier, said mixture of ethylene polymers consisting of ethylene vinyl acetate and ethylene n-butyl acrylate copolymers.

2. The adhesive of claim 1 that passes the IoPP Heat Stress test at a temperature of at least 150° F.

3. A low application temperature hot melt adhesive comprising a mixture of ethylene copolymers having a melt index of 750 grams/10 minutes or greater, a Fischer-Tropsch wax and a maleic anhydride modified gum rosin ester tackifier, said mixture of ethylene copolymers consisting of ethylene vinyl acetate and ethylene n-butyl acrylate copolymers.

4. The adhesive of claim 3 wherein the tackifier is a maleic anhydride modified Chinese gum rosin.

5. The adhesive of claim 3 comprising at least one ethylene n-butyl acrylate copolymer having a melt index of greater than 900 grams/10 minute.

6. The adhesive of claim 5 comprising an ethylene vinyl acetate copolymer having a melt index of greater than 900 grams/10 minute.

7. The adhesive of claim 6 comprising 20 to about 30 wt ethylene n-butyl acrylate copolymer containing from about 30 to about 40 wt % of n-butyl acrylate, from about 5 to about 15 wt % ethylene vinyl acetate copolymer containing from about 20 to about 35 wt % of vinyl acetate, from about 20 to about 40 wt % of a Fischer-Tropsch wax having a melting point of from about 60 to about 80° C., and from about 20 to about 45 wt % of a maleic anhydride modified gum rosin ester tackifier.

8. The adhesive of claim 7 comprising about 25 wt % of an ethylene n-butyl acrylate copolymer containing 33 wt % n-butyl acrylate, about 10 wt % of an EVA copolymer containing about 28 wt % vinyl acetate 30% of a Fischer-Tropsch wax having a melting point of about 71° C., and 35% of a maleic anhydride modified Chinese gum rosin.

9. A low application temperature hot melt adhesive comprising a mixture of ethylene copolymers having a melt index of 750 grams/10 minutes or greater, a Fischer-Tropsch wax and a maleic anhydride modified Chinese gum rosin.

10. The adhesive of claim 9 wherein said mixture of ethylene copolymers consists of ethylene vinyl acetate and ethylene n-butyl acrylate copolymers.

11. The adhesive of claim 7, said adhesive having a viscosity at 121° C. (250° F.) of less than 1300 cps.

12. The adhesive of claim 11, which adhesive passes the IoPP Heat Stress test at a temperature of at least 140° F.

13. The adhesive of claim 12, wherein the maleic anhydride modified gum rosin ester is maleic anhydride modified Chinese gum rosin.

14. The adhesive of claim 13 wherein said ethylene vinyl acetate copolymer contains about 28 wt % of vinyl acetate.

15. The adhesive of claim 13 comprising about 25 wt % of an ethylene n-butyl acrylate copolymer containing 33 wt % n-butyl acrylate, about 10 wt % of an ethylene vinyl acetate copolymer containing about 28 wt % vinyl acetate, 30% of a Fischer-Tropsch wax having a melting point of about 71° C., and 35% of a maleic anhydride modified Chinese gum rosin.

* * * * *